(12) United States Patent
Tuinman et al.

(10) Patent No.: US 6,201,035 B1
(45) Date of Patent: Mar. 13, 2001

(54) USE OF LOW UNSATURATED POLYETHER POLYOLS IN HIGH RESILIENCE SLABSTOCK FOAM APPLICATIONS

(75) Inventors: Roeland Tuinman, Novi; Thomas B. Lee, Southgate, both of MI (US); Thomas L. Fishback, Cuyahoga Falls, OH (US); Curtis J. Reichel, Southgate, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/578,208

(22) Filed: May 24, 2000

(51) Int. Cl.[7] .................................................... C08G 18/48
(52) U.S. Cl. ........................ 521/174; 521/137; 521/914; 521/161; 521/112
(58) Field of Search ..................................... 521/137, 160, 521/161, 174, 176, 914

(56) References Cited

U.S. PATENT DOCUMENTS

| | | | |
|---|---|---|---|
| Re. 33,291 | 8/1990 | Ramlow et al. | 521/137 |
| 1,922,459 | 8/1933 | Schmidt | 260/106 |
| 4,458,038 | 7/1984 | Ramlow et al. | 521/137 |
| 4,661,531 | 4/1987 | Davis et al. | 521/137 |
| 4,689,354 | 8/1987 | Ramlow et al. | 521/137 |
| 4,690,956 | 9/1987 | Ramlow et al. | 521/137 |
| 5,010,117 | 4/1991 | Herrington et al. | 521/159 |
| 5,491,177 | 2/1996 | De Witte | 521/159 |
| 5,563,221 | 10/1996 | Pazos | 525/409 |
| 5,605,939 | 2/1997 | Hager | 521/137 |
| 5,648,447 | 7/1997 | Seneker et al. | 528/63 |
| 5,900,441 | 5/1999 | De Witte et al. | 521/159 |
| 5,965,778 | 10/1999 | Allen et al. | 568/620 |

*Primary Examiner*—James J. Seidleck
*Assistant Examiner*—Melanie D. Bagwell
(74) *Attorney, Agent, or Firm*—Fernando A. Borrego

(57) ABSTRACT

The present invention discloses a method for the formation of and a flexible slabstock polyurethane foam having substantially improved indentation force deflection and resilience characteristics while maintaining the other physical properties. The method comprises the steps of: forming a polyol blend having a nominal functionality of at least 2.3 by combining at least one polyether polyol having a plurality of terminal ethylene oxide caps of from 5 to 25% by weight based on the total weight of the polyether polyol, a molecular weight of greater than or equal to 4000 Daltons, and an unsaturation of greater than 0.04 meq/g KOH; at least one graft polyether polyol having an equivalent weight of greater than 1000 Daltons, a solids content of at least 28%, and a plurality of terminal ethylene oxide caps of from 5 to 25% by weight based on the total weight of the graft polyether polyol; and at least one very low unsaturated polyether polyol having an unsaturation of less than or equal to 0.018 meq/g KOH and a plurality of terminal ethylene oxide caps of from 5 to 25% by weight based on the total weight of the polyether polyol; providing at least one polyisocyanate component; providing a catalyst; providing water as a blowing agent at a level of between 3 to 7% by weight; and combining the polyol blend with the polyisocyanate component, the catalyst and the water to form a slabstock polyurethane foam.

22 Claims, No Drawings

USE OF LOW UNSATURATED POLYETHER POLYOLS IN HIGH RESILIENCE SLABSTOCK FOAM APPLICATIONS

BACKGROUND OF THE INVENTION

This invention relates generally to a method for producing slabstock polyurethane foams and, more particularly, to the use of a polyol blend including a conventional unsaturated polyol, a graft polyol, and a very low unsaturated polyether polyol for the production of slabstock polyurethane foams.

Polyols are generally defined as compounds that include a plurality of hydroxyl groups. Polyols having at least two isocyanate-reactive hydrogen atoms, particularly polyether polyols, are useful when combined with polyisocyanates to form polyurethanes. Polyols can be combined with polyisocyanates in the presence of catalysts and blowing agents to form either rigid or flexible foams. Flexible polyurethane foams are distinct from rigid foams. Flexible foams typically have a limited resistance to an applied load, are open-celled, permeable to air and are reversibly deformable. Flexible foams can either be formed in a discontinuous molding process or through a continuous slabstock process. In the continuous slabstock process, typically, the components are rapidly mixed together and extruded onto a moving bed reactor where the foam is permitted to freely rise to its final height. After the foam has fully risen it is processed to the desired final dimensions. Flexible foams are particularly useful in seating applications, carpet padding and other applications requiring reversible deformation of the foam.

Two important properties of flexible slabstock foam are its indentation force deflection and resilience. Many current flexible slabstock foam formulations suffer from less than ideal indentation force deflection and resilience properties. It would be advantageous to provide a flexible slabstock formulation having improved indentation force deflection and resilience properties

SUMMARY OF THE INVENTION

In general terms, this invention provides a method for making a flexible slabstock polyurethane foam using a polyol blend including a conventional unsaturated polyether polyol, a graft polyether polyol, and a very low unsaturated polyether polyol. The foam produced by the method has substantially improved indentation force deflection and resilience properties while maintaining the other physical properties of the foam when compared to foam made without the very low unsaturated polyether polyol. These improved properties greatly enhance the foam's loadbuilding characteristics.

In one embodiment, the present invention is a method for the formation of a slabstock polyurethane foam comprising the steps of forming a polyol blend having a nominal functionality of at least 2.3 by combining the following: at least one polyether polyol having a plurality of terminal ethylene oxide caps of from 5 to 25% by weight based on the total weight of the polyether polyol, a molecular weight of greater than or equal to 4000 Daltons, and an unsaturation of greater than 0.04 meq/g KOH; at least one graft polyether polyol having an equivalent weight of greater than 1000 Daltons, a solids content of at least 28%, and a plurality of terminal ethylene oxide caps of from 5 to 25% by weight based on the total weight of the graft polyether polyol; and at least one very low unsaturated polyether polyol having an unsaturation of less than or equal to 0.018 meq/g KOH and a plurality of terminal ethylene oxide caps of from 5 to 25% by weight based on the total weight of the polyether polyol. Additional steps comprise providing at least one polyisocyanate component; providing a catalyst; providing water as a blowing agent at a level of between 3 to 7% by weight; and combining the polyol blend with the polyisocyanate component, the catalyst and the water to form a slabstock polyurethane foam.

In another embodiment, the invention is a slabstock polyurethane foam comprising the reaction product of: a polyether polyol blend having a nominal functionality of at least 2.3 and comprising at least one polyether polyol having a plurality of terminal ethylene oxide caps of from 5 to 25% by weight based on the total weight of said at least one polyether polyol, a molecular weight of greater than or equal to 4000 Daltons, and an unsaturation of greater than 0.04 meq/g KOH; at least one graft polyether polyol having an equivalent weight of greater than 1000 Daltons, a solids content of at least 28%, and a plurality of terminal ethylene oxide caps of from 5 to 25% by weight based on the total weight of said at least one graft polyether polyol; and at least one very low unsaturated polyether polyol having an unsaturation of less than or equal to 0.018 meq/g KOH and a plurality of terminal ethylene oxide caps of from 5 to 25% by weight based on the total weight of said at least one polyether polyol; and a polyisocyanate component in the presence of a catalyst, water at a level of between 3 to 7% by weight as a blowing agent, and optionally, one or more surfactants.

Polyurethane foams produced using the method of the present invention have substantially improved indentation force deflection and resilience characteristics compared to a foam made with a similar polyol blend without the very low unsaturated polyether polyol. The improved properties do not come at the expense of other physical characteristics of the foam, these are maintained.

These and other features and advantages of this invention will become more apparent to those skilled in the art from the following detailed description of the presently preferred embodiment.

DETAILED DESCRIPTION OF A PREFERRED EMBODIMENT

The flexible slabstock polyurethane foams of the present invention are prepared by combining a polyol blend comprising a conventional polyether polyol, a graft polyether polyol and a very low unsaturated polyether polyol with an isocyanate component in the presence of a catalyst and water as a blowing agent. The foams optionally include other additives such as, for example, surfactants, chain extenders/crosslinkers, surface-active substances, flame retardants, and fillers.

Methods of forming conventional and very low unsaturated polyether polyols are well known, for example, by the base catalyzed addition of alkylene oxides to an initiator molecule or nucleus containing reactive hydrogens such as a polyhydric alcohol. In one embodiment of the present invention the initiator nucleus is a triol. Examples of such initiators include: glycerol; 1,1,1-trimethylolpropane; 1,1,1-trimethylolethane; 1,2,6-hexanetriol; pentaerythritol; and sorbitol. Other suitable initiators include both aliphatics and aromatics, such as ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol. Also included within the term "polyhydric alcohol" are compounds derived from phenol such as 2,2-bis(4-hydroxyphenyl)propane, commonly known as Bisphenol A. The polyether polyols may be prepared by any known process such as, for example, the process disclosed by Wurtz in 1859, *Encyclopedia of Chemical Technology,* Vol. 7, pp. 257–262, Published by Interscience Publishers, Inc. (1951) or in U.S. Pat. No. 1,922,459.

Examples of useful alkylene oxides include ethylene oxide, propylene oxide, butylene oxide, amylene oxide, mixtures thereof, tetrahydrofuran, alkylene oxide-tetrahydrofuran mixtures, epihalohydrins, and arylalkylene styrene. The alkylene oxides are added onto the initiator molecule and chain propagation is carried out in the presence of catalysts by either anionic polymerization or by cationic polymerization.

The preferred catalysts are potassium hydroxide, sodium hydroxide, alcoholates of potassium hydroxide, alcoholates of sodium hydroxide, cesium catalysts, amines, Lewis acid catalysts, or double metal complex catalysts, all of which are known in the art.

Polyols useful in the present invention generally comprise polyether polyols that may have the structure of a plurality of internal blocks formed from oxyalkylenes attached to an initiator molecule. The internal blocks may include any of the above referenced oxyalkylenes. Generally the internal blocks are capped by terminal ethylene oxide caps. The terminal ethylene oxide caps generally comprise ethylene oxide in an amount from 5 to 25% by weight based on the total weight of the polyol. In one embodiment, the majority of the oxyalkylenes in the internal blocks comprise propylene oxide such that at least 65% by weight of the internal block is propylene oxide based on the total weight of the internal block.

As discussed above, one of the polyols in the blend is a conventional polyether polyol, preferably this polyol has a degree of unsaturation of at least 0.040 meq/g KOH. In addition, the polyol blend used in the present invention includes a polyol having a very low degree of unsaturation, namely, an unsaturation of less than or equal to 0.018 meq/g KOH produced as described above. In one embodiment, the polyether polyols used in the present invention have a molecular weight of at least 4,000 Daltons. In addition, it is preferred that polyols used in the present invention have a hydroxyl number of between 40 to 250 mg KOH/g. It is preferred that the polyol blend have a nominal functionality of at least 2.3 and preferably higher. Nominal functionality greater than about 2.3 is generally required for stability of the foam cell structure.

The polyol blend of the present invention also includes a graft polyether polyol. Graft polyols are generally defined as vinyl polymer dispersions in polyether polyols. Specifically, the term "graft polyols" describes a structure of a polyether polyol segment having attached to it a vinyl polymer. Methods for the formation of graft polyols are known in the art. Graft polyols are generally prepared by the in situ polymerization in a polyether polyol of an ethylenically unsaturated monomer or a mixture of ethylenically unsaturated monomers. Generally, the polyether polyols used as the backbone for the graft polyol have either natural or induced unsaturation levels of between 0.2 to 0.001 moles per mole of polyol. The unsaturated polyether polyols employed in preparing the graft polyols may be prepared by the reaction of any conventional polyol, such as those described above, with an organic compound having both ethylenic unsaturation and a hydroxyl, carboxyl, anhydride, isocyanate, or epoxy group, or other group reactive with an active hydrogen-containing group, or they may be prepared by employing an organic compound having both ethylenic unsaturation and a hydroxyl, carboxyl, anhydride, or epoxy group, or other group reactive with an active hydrogen-containing group as a reactant in the preparation of the conventional polyether polyol.

Representatives of such organic compounds include unsaturated monopolycarboxylic acids and anhydrides such as maleic acid and anhydride, fumaric acid, crotonic acid and anhydride, propenyl, succinic anhydride, acrylic acid, acryloyl chloride, hydroxide ethyl acrylate or methacrylate and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4,epoxide, butadiene monoxide, vinylglycidyl ether (1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkenyl oxide, preferably ethylene or propylene oxide, to replace the carboxyl groups with hydroxyl groups prior to employment in the present invention. The amount of alkylene oxide employed is such as to reduce the acid number of the unsaturated polyol to about 5 or less.

The ethylenically unsaturated monomers which are added onto the unsaturated polyols discussed above are generally polymerized in the presence of an effective mount of a free radical initiator and may include the use of chain transfer agents as reaction moderators. The polymerization reaction is generally carried out at temperatures between 25° C. and 180° C.

Representative ethylenically unsaturated monomers which may be employed in preparing the graft polyols of the present invention include butadiene, isoprene, 1,4-pentadiene, 1,6-hexadiene, 1,7-octadiene, styrene, alpha-methylstyrene, 2-methylstyrene, 3-methylstyrene, 4-methylstyrene, 2,4-dimethylstyrene, ethylstyrene, isopropylstyrene, butylstyrene, phenylstyrene, cyclohexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methylacryl acrylate, 2-hydroxyethyl acrylate, methyl methacrylate, cyclohexyl methacrylate, benzyl methacrylate, isopropyl methacrylate, octyl methacrylate, methacrylonitrile, ethyl alpha-ethoxyacrylate, methyl alpha-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacryloyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinylmethoxyacetate, vinyl benzoate, vinyl toluene, vinylnaphthalene, vinyl methyl ether, vinyl propyl ethers, vinyl butyl ethers, vinyl 2-ethylhexyl ether, vinylphenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinylethyl ketone, vinyl phosphonates such as vinyl phenyl ketone, vinyl ethyl sulfone, N-methyl-N-vinyl acetamide, N-vinylpyrrolidone, vinyl imidazole, divinyl sulfoxide, divinyl sulfone, sodium vinylsulfonate, methyl vinylsulfonate, N-vinyl pyrrole and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like.

Any of the known polymerizable ethylenically unsaturated monomers can be used and the compounds listed above are illustrative and not restrictive of the monomers suitable for use in this invention. In one embodiment, the monomer is selected from the group of acrylonitrile, styrene, and mixtures thereof.

The amount of ethylenically unsaturated monomer employed in the polymerization reaction is generally from 25 to 70%, based on the total weight of the product. Generally the reaction will employ from about 0.1 weight percent to about 3.0 weight percent of a free radical initiator based on the total weight of the monomers utilized.

Free radical initiators that may be used include the well-known free radical types of vinyl polymerization initiators such as the peroxides, persulfates, perborates, percarbonates, azo compounds, etc. These include hydrogen peroxide, dibenzoyol peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, difuroyl peroxide, bis(triphenylmethyl) peroxide, bis(p-methoxybenzoyl) peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, alpha, alpha'-azobis-(2-methylheptonitrile), 1,1'-azobis(cyclohexane carbonitrile), 4,4' azobis-(4-cyanopentanoic acid), 2,2'-azobis(isobutyronitrile), 1-t-butylazo-1-cyanocyclohexane, persuccinic acid, diisopropyl peroxydicarbonate, 4,4'-azobis(2,4-dimethylvaleronitrile), 2-t-butylazo-2-cyano-4-methoxy-4-methylpentane, 2,2'-azobis-2-methylbutanenitrile,2-t-butylazo-2-cyanobutane, 1-t-amylazo-1-cyanocyclohexane, 2,2'-azobis(2,4-dimethyl-4-methoxyvaleronitrile), 2,2'-azobis-2-methylbutyronitrile,2-t-butylazo-2-cyano-4-methylpentane, 2-t-butylazo-2-isobutyronitrile, 2-butylperoxyisopropyl carbonate and the like; a mixture of initiators may also be used.

Among those chain transfer agents which may be employed are as follows: acetic aid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetonitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanate, 1-phenylbutyne, p-cresol, p-bromocumene, dibenzonaphthacene, p-dioxane, pentaphenyl ethane, ethanol, 1,1-diphenylethylene, ethylene glycol, ethyl ether, fluorene, N,N-dimethylformamide, 2-heptene, 2-hexene, isobutylraldehyde, diethyl bromomalonate, bromotrichloromethane, dibromoethane, diiodomethane, naphthalene, 1-naphthol, 2-napthol, methyl oleate, 2,4,4-triphenyl-1-pentene, 4-methyl-2-pentene, 2,6-diisopropylphenol, phenyl ether, phenylphosphine, diethylphosphine, dibutylphosphine, phosphorus trichloride, 1,1,1-tribromopropane, dialkyl phthalate, 1,2-propanediol, 3-phosphinopropionitrile, 1-propanol, pyrocatechol, pyrogallol, methyl stearate, tetraethylsilane, triethylsilane, dibromostilbene, alpha-bromostyrene, alpha-methylstyrene, tetraphenyl succinonitrile, 2,4,6-trinitrotoluene, p-toluidine, N,N-dimethyl-p-toluidine, alpha-cyano-p-tolunitrile, alpha, alpha'-dibromo-p-xylene, 2,6-xylenol, diethyl zinc, dithiodiacetic acid, ethyl dithiodiacetic acid, 4,4'-dithiobisanthranilic acid, benzenethiol, o-ethoxybenzenethiol, 2,2'-dithiodiacetic acid, 4,4'-dithio-bisanthranilic acid, benzenethiol, o-ethoxybenzenethiol, 2,2'-dithiobixbenzothiazole, benzyl sulfide, 1-dodecanethiol, ethanethiol, 1-hexanethiol, 1-napthalenethiol, 2-naphthalenethiol, 1-octanethiol, 1-heptanethiol, 2-octanethiol, 1-tetradecanethiol, alpha-tuluenethiol, isopropanol, 2-butanol, carbon tetrabromide and tertiary dodecylmercaptan. Preferred chain transfer agents are 2-propanol and 2-butanol.

The chain transfer agents employed will depend on the particular monomers or mixtures of monomers employed and the molar ratios of such mixtures. The concentration of the chain transfer agent that is employed may range from 0.1 to 30 percent by weight, preferably from 5 to 20 percent by weight, based on the weight of the monomer.

General descriptions of graft polymer dispersions and processes for preparing graft polymer dispersions are set forth in U.S. Patents U.S. Pat. No. RE 33,291; U.S. Pat. Nos 4,690,956; 4,689,354; 4,458,038; and 4,661,531. It is preferable that when styrene and acrylonitrile are used that they are present in a ratio of 1:1. It is furthermore preferable that the graft polyether polyol have an equivalent weight of greater than 1,000 Daltons and a solids content of at least 28%.

As discussed above, the present invention includes the use of a polyol blend comprising a conventional polyether polyol, a very low unsaturation polyether polyol, and a graft polyether polyol. The blend generally has a functionality of at least 2.3 and comprises from 10 to 30% by weight of the conventional polyol, from 30 to 50% by weight of the very low unsaturation polyol, and from 40 to 60% by weight of the graft polyol, based on the total weight of the polyol blend.

The isocyanate component is preferably a polyisocyanate, herein defined as having 2 or more isocyanate functionalities, examples of these include conventional aliphatic, cycloaliphatic, and preferably aromatic isocyanates. Specific examples include: alkylene diisocyanates with 4,2,12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures 4,4'-2,2'- and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures, and 2,2'-diphenylmethane diisocyanate and the corresponding isomeric mixtures, mixtures of 4,4'-, 2,4'-, and 2,2- diphenylmethane diisocyanates and polyphenylene polymethylene polyisocyanates (crude MDI). In one embodiment, the isocyanate component is a toluene diisocyanate or a mixture of toluene diisocyanates. The isocyanate component may comprise any suitable toluene diisocyanate including, for example, 2,4-toluene diisocyanate; 2,6-toluene diisocyanate and the like. Particularly suitable mixtures are those containing from about 65 to about 80% 2,4-toluene diisocyanate and the balance 2,6-toluene diisocyanate. Commercially available mixtures containing about 80% of 2,4- and about 20% of 2,6-toluene diisocyanate are most preferred. Generally the isocyanate and the polyol blend are combined at an isocyanate index of from 90 to 120.

The catalysts used for the preparation of the slabstock polyurethane foams are, in particular, compounds that strongly accelerate the reaction of the hydroxyl groups of the polyol with the isocyanate component. Suitable catalysts are organic metal compounds, preferably organic tin compounds such as tin (II) salts of organic carboxylic acids, e.g., tin (II) acetate, tin (II) octoate, tin (II) ethylhexanate and tin (II) laurate, and the dialkyltin (IV) salts of organic carboxylic acids, e.g., dibutyltin diacetate, dibutyltin dilaurate, dibutyltin maleate, and dioctyltin diacetate. The organic metal compounds are used alone or preferably in combination with strongly basic amines. Examples which may be mentioned are amines such as 2,3-dimethyl-3,4,5,6-tetrahydropyrimidine or tertiary amines such as triethylamine, tributylamine; dimenthylbenzylamine; N-methylmorpholine; N-ethylmorpholine; N-cyclohexylmorpholine; N,N,N',N'-tetramethylethylenediamine; N,N,N',N'-tetramethylbutanediamine; N,N,N',N'-tetramethylhexane-1, 6-diamine; pentamethyldiethylenetriamine; bis (dimethylaminoethyl) ether; bis (dimethylaminopropyl) urea; dimethylpiperazine; 1,2-dimethylimidazole; 1-azabicyclo [3.3.0] octane and preferably 1,4-diazabicyclo [2.2.2] octane. Additionally, one can use alkanolamine compounds such as triethanolamine; triisopropanolamine; N-methyldiethanolamine and N-ethyldiethanolamine and dimethylethanolamine.

Additional suitable catalysts include: tris (dialkylaminoalkyl)-s-hexahydrotriazines, in particular tris (N,N-dimethylaminopropyl)-s-hexahydrotriazine; tetraalkylammonium hydroxides such as tetramethylammonium hydroxide; alkali metal hydroxides such as sodium hydroxide and alkali metal alkoxides such as sodium methoxide and potassium isopropoxide and also alkali metal salts of long-chain fatty acids having from 10 to 20 carbon atoms and possibly lateral OH groups in combinations of the organic metal compounds and strongly basic amines. Preference is given to using from 0.001 to 5% by weight, in particular from 0.05 to 2% by weight, of catalysts or catalyst combination, based on the weight of the polyol.

One of the especially preferred additives are compounds comprising silicon atoms and polyether chains. These additives are preferably used in an amount of from 0.5 to 5% by weight, based on the total weight of the polyol. These compounds are silicone-polyether copolymers. The products have an average molecular weight of about 8,000, with the molecular weight distribution being relatively broad. The siloxane chain has an average length of about 40 $(CH_3)_2SiO$ units and has an average of 5 polyether chains linked to it. The polyether chains preferably comprise ethyleneoxide and propyleneoxide in a ratio of 1:1 and have a hydroxyl group at the end. The molecular weight of the polyether chains is about 1,500. Such products are commercially available and are sold, for example, by Goldschmidt A. G. under the name Tegostab™.

Suitable surface-active substances that may also be added include, for example, compounds, which serve to aid the homogenization of the starting materials and also may be suitable for regulating the cell structure. Examples which may be mentioned are emulsifiers such as the sodium salts of castor oil sulfates or fatty acids and also amine salts of fatty acids, e.g. Diethylamine oleate, diethylamine sterate, diethylamine ricinoleate, salts of sulfonic acid, e.g. Alkali metal or ammonium salts of dodecylbenzene-or dinaphthylmethanedisulfonic acid and ricinoliec acid; foam stabilizers such as siloxane-oxyalkylene copolymers and other organopolysiloxanes, ethoxylated alkylphenols, ethoxylated fatty alcohols, paraffin oils, castor oil or ricinoliec esters, Turkey red oil and peanut oil. Additives may also include cell regulators such as paraffins, fatty alcohols, dimethylpolysiloxanes. Oligomeric polyacrylates having polyoxyalkane and fluoroalkane radicals as side groups are also suitable for improving the emulsifying action, the cell structure and/or stabilizing the foam. The surface-active substances are usually employed in amounts of from 0.01 to 5 parts by weight, based on 100 parts by weight of the components other than the isocyanate component.

Suitable chain extender/crosslinkers that may be used include diols and/or triols having molecular weights of less than about 400. Examples of suitable chain extenders/crosslinkers are aliphatic, cycloaliphatic and/or aromatic diols having from 2 to 14, preferably from 4 to 10, carbon atoms, e.g., ethylene glycol; 1,3-propanediol; 1,10-decanediol; o-, m-, p-dihydroxycyclohexane; diethylene glycol; dipropylene glycol, and preferably 1,4-butanediol, 1,6-hexanediol and bis (2-hydroxyethyl) hydroquinone, triols such as 1,2,4- and 1,3,5-trihydroxyclylohexane, and low molecular weight hydroxyl-containing polyalkylene oxides based on ethylene oxide and/or 1,2-propylene oxide in the above-mentioned diols and/or triols as initiator molecules. These compounds are preferably used in amounts of from 0 to 20% by weight based on the total weight of the polyol.

Flame retardants that may be used include pentabromodiphenyl oxide; dibromopropanol; tris (β-chloropropyl) phosphate; 2,2-bis (bromoethyl) 1,3-propanediol; tetrakis (2-chloroethyl) ethylene diphosphate; tris (2,3-dibromopropyl) phosphate; tris (β-chloroethyl) phosphate; tris (1,2-dichloropropyl) phosphate; bis-(2-chloroethyl) 2-chloroethylphosphonate; molybdenumtrioxide; ammonium molybdate; ammonium phosphate; pentabromodiphenyloxide; tricresyl phosphate; hexabromocyclododecane; melamine; and dibromoethyldibromocyclohexane. Concentrations of flame retardant compounds, which may be employed range from 50 to 25 parts per 100 parts of polyol.

The foam may further include fillers such as organic, inorganic and reinforcing fillers. Specific examples are: inorganic fillers such as siliceous minerals, for example, sheet silicates such as antigorite, serpentine, hornblends, amphiboles, chrysotile, zeolites, talc; metal oxides, such as kaolin, aluminum oxides, titanium oxides and iron oxides, meta salts, such as chalk, barite, aluminum silicates and inorganic pigments such as cadmium sulfide, zinc sulfide, and also glass particles. Examples of organic fillers are: carbon black, melamine, rosin, cyclopentadienyl resins. The organic and inorganic fillers can be used individually or as mixtures and are advantageously incorporated into the reaction mixture in amounts of from 0.5 to 50% by weight based on the weight of the polyol and the isocyanate component.

To form the foam of the present invention the polyol blend, catalyst, water, and any other additional components are premixed to form a resin. Shortly after formation of the resin, the resin is combined in a mixhead with the isocyanate component and the mixture is extruded onto a moving bed reactor. As the foam travels down the moving bed reactor it rises and cures. The cured foam is then processed as necessary. The method of forming a slabstock foam is known to one of ordinary skill in the art. The components of the prepared examples 1–4 are given below. Sample 1 is the comparative example without the very low unsaturation polyol, examples 2–4 are various combination of the conventional polyol, the very low unsaturation polyol, and the graft polyol.

FORMULATION TABLE EXAMPLES 1–4

| Component | Sample 1 | Sample 2 | Sample 3 | Sample 4 |
|---|---|---|---|---|
| Polyol A | 60.00 | 30.00 | 10.00 | 20.00 |
| Polyol B | 0.00 | 30.00 | 50.00 | 40.00 |
| Polyol C | 40.00 | 40.00 | 40.00 | 40.00 |
| Anti Blaze 100 | 4.00 | 4.00 | 4.00 | 4.00 |
| T-12 | 0.06 | 0.00 | 0.00 | 0.00 |
| UL-1 | 0.00 | 0.03 | 0.03 | 0.03 |
| Dabco 33LV | 0.12 | 0.12 | 0.12 | 0.12 |
| A-1 | 0.04 | 0.04 | 0.04 | 0.04 |
| DC-5043 | 0.80 | 0.20 | 0.15 | 0.20 |
| DC-5258 | 0.00 | 0.80 | 0.80 | 0.80 |
| DEOA-LF | 1.60 | 1.60 | 1.60 | 1.60 |
| Water | 3.20 | 3.20 | 3.20 | 3.20 |
| Toluene Diisocyanate | 42.60 | 42.50 | 42.50 | 42.50 |
| Isocyanate Index | 105.00 | 105.00 | 105.00 | 105.00 |

Polyol A is a triol trimethylolpropane initiated polyol having an unsaturation of 0.068, a molecular weight of 5,100, and an internal block of all propylene oxide with an ethylene oxide terminal cap.

Polyol B is a triol glycerin initiated polyol having an unsaturation of 0.017 and a molecular weight of 6,200. The polyol has an internal block that is a randomly polymerized mixture of propylene oxide and ethylene oxide. The polyol has an ethylene oxide terminal cap that is at least 5% by weight based on the total weight of the polyol.

Polyol C is a graft polyol having a trimethylolpropane initiated polyol backbone with a propylene oxide internal block attached to a 13% by weight based on the total weight of the polyol ethylene oxide cap. The graft polyol is formed from a mixture of styrene: acrylonitrile and has at least 28% solids.

AntiBlaze 100® is a trichloropropyl phosphate additive flame retardant from Albright & Wilson.

T-12 is dibutyltin dilaurate.

UL-1 is dibutyltin dimercaptid.

DABCO 33LV is a dipropylene glycol solution containing 33% triethylenediamine.

A-1 is a 70% solution of bis-(dimethylaminoethyl) ether in dipropylene glycol.

DC 5043 and DC 5258 are silicone glycerol copolymer surfactants.

DEOA-LF is 80% diethanolamine in water.

The toluene diisocyanate was an 80:20 mixture of 2,4-toluene diisocyanate and 2,6-toluene diisocyanate. All the components except the toluene diisocyanate of each foam were premixed and then components were mixed with the toluene diisocyanate and the foams were allowed to free rise and cure. For each sample the data value from the bottom of the foam is presented first followed by the data value for the bottom of the foam.

| Measured Factor | Sample 1 | Sample 2 | Sample 3 | Sample 4 |
|---|---|---|---|---|
| Core Density (pcf) | 1.81; 1.64 | 1.86; 1.85 | 1.80; 1.88 | 1.88; 1.89 |
| Original 25% Indentation Force Deflection (IFD), lbs. | 29.5; 26.9 | 34.7; 37.2 | 34.6; 38.0 | 38.2; 38.0 |
| Original 65% IFD, lbs. | 67.4; 60.4 | 86.5; 82.0 | 80.2; 88.6 | 96.6; 88.4 |
| Original 25% RT IFD, lbs. | 19.2; 17.8 | 23.7; 24.9 | 21.7; 24.1 | 24.7; 24.8 |
| Sag Factor | 2.28; 2.24 | 2.49; 2.21 | 2.32; 2.33 | 2.53; 2.33 |
| Percent Recovery | 65.2; 66.0 | 68.2; 67.0 | 62.7; 63.4 | 64.8; 65.3 |
| Air Flow, cfm | 1.12; 1.04 | 1.11; 1.04 | 0.70; 0.40 | 0.95; 0.78 |
| Original Peak Tensile, psi | 18.8; 19.7 | 13.9; 19.3 | 15.1; 19.8 | 16.4; 18.7 |
| Original Break Elongation Percent | 142.6; 144.9 | 90.3; 101.9 | 102.4; 103.5 | 99.6; 97.6 |
| Heat Aged Peak Tensile | 19.8; 16.4 | 15.8; 13.3 | 18.9; 20.3 | 18.8; 21.0 |
| Original block tear | 3.37; 2.99 | 2.89; 2.71 | 2.75; 2.71 | 2.34; 2.54 |
| Falling Ball Resilience | 54; 51 | 51; 51 | 45; 37 | 47; 47 |
| Compression Load Deflection 50%, Original Humid Aged | 0.49; 0.47 | 0.60; 0.63 | 0.61; 0.62 | 0.73; 0.69 |
| Compression Load Deflection 50% Humid Aged | 0.40; 0.37 | 0.45; 0.43 | 0.44; 0.43 | 0.51; 0.47 |
| Compression Load Deflection 50% Humid Aged Percent of Original | 83.3; 79.41 | 73.80; 67.51 | 73.03; 69.63 | 69.66; 67.77 |
| Compression Load Deflection 50% Original Heat Aged | 0.55; 0.47 | 0.58; 0.58 | 0.62; 0.64 | 0.63; 0.64 |
| Compression Load Deflection 50% Heat Aged | 0.61; 0.46 | 0.59; 0.58 | 0.62; 0.63 | 0.65; 0.67 |
| Compression Load Deflection 50% Heat Aged Percent of Original | 110.16; 98.50 | 101.03; 100.34 | 101.30; 97.36 | 103.32; 105.16 |
| Compression Set Original 50% | 12.64; 14.17 | 11.18; 12.95 | 13.93; 19.72 | 12.78; 15.21 |
| Compression Set Original 90% | 13.10; 14.96 | 11.93; 9.46 | 13.28; 15.82 | 10.87; 16.00 |

-continued

| Measured Factor | Sample 1 | Sample 2 | Sample 3 | Sample 4 |
|---|---|---|---|---|
| Compression Set Humid Aged 50% | 25.75; 30.95 | 33.33; 36.71 | 47.75; 47.55 | 43.29; 45.73 |
| Compression Set Humid Aged 90% | 64.73; 76.38 | 53.69; 66.73 | 81.83; 78.75 | 64.20; 72.72 |

The data clearly shows the advantage of adding a very low unsaturated polyether polyol to the blend of a conventional polyol and a graft polyol. Foam prepared with the very low unsaturated polyether polyol had significantly improved IFD values at 25%, 65% and 25% RT IFD. In addition, there was a significant improvement in resilience properties. The table furthermore demonstrates that the other physical properties of test samples are not significantly different from that of Example 1. Thus, inclusion of this very low unsaturated polyether polyol in the blend provides a foam having many of the physical characteristics of foams made with a blend of a conventional polyol and a graft polyol but improved indentation force deflection and resilience characteristics.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A method for the formation of a slabstock polyurethane foam comprising the steps of:
   a) forming a polyol blend having a nominal functionality of at least 2.3 by combining (1) at least one polyether polyol having a plurality of terminal ethylene oxide caps of from 5 to 25% by weight based on the total weight of the polyether polyol, a molecular weight of greater than or equal to 4,000 Daltons, and an unsaturation of greater than 0.04 meq/g KOH; (2) at least one graft polyether polyol having an equivalent weight of greater than 1,000 Daltons, a solids content of at least 28%, and a plurality of terminal ethylene oxide caps of from 5 to 25% by weight based on the total weight of the graft polyether polyol; and (3) at least one polyether polyol having an unsaturation of less than or equal to 0.018 meq/g KOH and a plurality of terminal ethylene oxide caps of from 5 to 25% by weight based on the total weight of the polyether polyol;
   b) providing at least one polyisocyanate component;
   c) providing a catalyst;
   d) providing water as a blowing agent at a level of between 3 to 7% by weight; and
   e) reacting the polyol blend with the polyisocyanate component, in the presence of the catalyst and the water to form a slabstock polyurethane foam.

2. A method as recited in claim 1 wherein step a) comprises combining the at least one polyether polyol (1) with the at least one polyether polyol (3) at a weight to weight ratio of from 1:1 to 1:5.

3. A method as recited in claim 1 wherein step a) comprises forming the polyol blend by combining from 10% to 30% by weight of the at least one polyether polyol (1), from 40% to 60% by weight of the at least one graft polyether polyol (2), and from 30% to 50% by weight of the at least one polyether polyol (3), all of the weight percentages based on the total weight of the polyol blend.

4. A method as recited in claim 1 wherein step a) the at least one graft polyether polyol (2) and the at least one polyether polyol (3) are combined with the at least one polyether polyol (1) to form the polyol blend and the at least one polyether polyol (1) has a structure of an initiator nucleus attached to a plurality of internal blocks comprising propylene oxide, with the internal blocks attached to the plurality of terminal ethylene oxide caps.

5. A method as recited in claim 1 wherein step a) the at least one polyether polyol (1) and the at least one graft polyether polyol (3) are combined with the at least one polyether polyol (3) to form the polyol blend and the at least one polyether polyol (3) has a structure of an initiator nucleus attached to a plurality of internal blocks comprising propylene oxide and ethylene oxide, with the internal blocks attached to the plurality of terminal ethylene oxide caps.

6. A method as recited in claim 1 wherein step a) the at least one polyether polyol (1) and the at least one graft polyether polyol (2) are combined with the at least one polyether polyol (3) to form the polyol blend and the at least one polyether polyol (3) has a structure of an initiator nucleus attached to a plurality of internal blocks comprising propylene oxide and ethylene oxide in a ratio of from 1:1 to 2:1, with the internal blocks attached to the plurality of terminal ethylene oxide caps.

7. A method as recited in claim 1 wherein step a) the at least one polyether polyol (1) and the at least one polyether polyol (3) are combined with the at least one graft polyether polyol (2) to form the polyol blend and the at least one graft polyether polyol (2) has a structure of an initiator nucleus attached to a plurality of internal blocks comprising propylene oxide with the internal blocks attached to the plurality of terminal ethylene oxide caps and a plurality of styrene and acrylonitrile polymerized onto the internal block.

8. A method as recited in claim 1 wherein step e) comprises reacting the polyol blend with the polyisocyanate component at an isocyanate index of from 90 to 120.

9. A method as recited in claim 1 wherein step e) comprises reacting the polyol blend with the polyisocyanate component, in the presence of the catalyst and the water to form a slabstock polyurethane foam having a core density of from 1.1 to 2.5 pounds per cubic foot.

10. A method as recited in claim 1 wherein step b) comprises providing a mixture of toluene diisocyanates as the polyisocyanate component.

11. A method as recited in claim 1 wherein step e) comprises blending at least one surfactant with the polyol blend, then reacting the blend with the polyisocyanate component, in the presence of the catalyst and the water to form a slabstock polyurethane foam.

12. A method as recited in claim 1 wherein step e) comprises blending a silicone surfactant with the polyol blend, the reacting the blend with the polyisocyanate component in the presence of the catalyst and the water to form a slabstock polyurethane foam.

13. A slabstock polyurethane foam comprising the reaction product of:

a) a polyether polyol blend having a nominal functionality of at least 2.3 and comprising at least one polyether polyol (1) having a plurality of terminal ethylene oxide caps of from 5 to 25% by weight based on the total weight of said at least one polyether polyol, a molecular weight of greater than or equal to 4000 Daltons, and an unsaturation of greater than 0.04 meq/g KOH; at least one graft polyether polyol (2) having an equivalent weight of greater than 1000 Daltons, a solids content of at least 28%, and a plurality of terminal ethylene oxide caps of from 5 to 25% by weight based on the total weight of said at least one graft polyether polyol; and at least one polyether polyol (3) having an unsaturation of less than or equal to 0.018 meq/g KOH and a plurality of terminal ethylene oxide caps of from 5 to 25% by weight based on the total weight of said at least one polyether polyol; and b) a polyisocyanate component in the presence of;

c) a catalyst;

d) water at a level of between 3 to 7% by weight as a blowing agent; and e) optionally, one or more surfactants.

14. A slabstock polyurethane foam as recited in claim 13 wherein said polyol blend comprises said at least one polyether polyol (1) and said at least one polyether polyol (3) combined at a weight to weight ratio of from 1:1 to 1:5.

15. A slabstock polyurethane foam as recited in claim 13 wherein said polyol blend comprises from 10% to 30% by weight of said at least one polyether polyol (1), from 40% to 60% by weight of said at least one graft polyether polyol (2), and from 30% to 50% by weight of said at least one polyether polyol (3), all of the weight percentages based on the total weight of said polyol blend.

16. A slabstock polyurethane foam as recited in claim 13 wherein said at least one polyether polyol (1) comprises an initiator nucleus attached to a plurality of internal blocks comprising propylene oxide with said plurality of internal blocks attached to said plurality of terminal ethylene oxide caps.

17. A slabstock polyurethane foam as recited in claim 13 wherein said at least one polyether polyol (3) comprises an initiator nucleus attached to a plurality of internal blocks comprising propylene oxide and ethylene oxide with said plurality of internal blocks attached to said plurality of terminal ethylene oxide caps.

18. A slabstock polyurethane foam as recited in claim 17 wherein said internal blocks of said very low unsaturated polyether polyol comprise propylene oxide and ethylene oxide in a ratio of from 1:1. to 2:1.

19. A slabstock polyurethane foam as recited in claim 17 wherein said at least one graft polyether polyol (2) comprises an initiator nucleus attached to a plurality of internal blocks of alkylene oxide with said plurality of internal blocks attached to said plurality of terminal ethylene oxide caps and further including a plurality of styrene and acrylonitrile polymerized onto said internal blocks.

20. A slabstock polyurethane foam as recited in claim 13 wherein said foam has a core density of from 1.1 to 2.5 pounds per cubic foot.

21. A slabstock polyurethane foam as recited in claim 13 wherein said polyisocyanate component comprises a toluene diisocyanate or a mixture of toluene diisocyanates.

22. A slabstock polyurethane foam as recited in claim 13 further comprising a silicone surfactant.

* * * * *